United States Patent
Schrab et al.

(10) Patent No.: US 6,272,675 B1
(45) Date of Patent: Aug. 7, 2001

(54) DEVELOPMENT SYSTEM FOR AUTOMATICALLY ENABLING A SERVER APPLICATION TO EXECUTE WITH AN XATMI-COMPLIANT TRANSACTION MANAGER MANAGING TRANSACTIONS WITHIN MULTIPLE ENVIRONMENTS

(75) Inventors: Jacqueline M. Schrab, New Brighton; James S. Sebesta, Champlin; Joey L. Erickson; Susan A. Senger, both of New Brighton, all of MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/164,756

(22) Filed: Oct. 1, 1998

(51) Int. Cl.[7] ........................................... G06F 9/45
(52) U.S. Cl. ............................. 717/2; 717/1; 345/326
(58) Field of Search ............................. 717/2, 1; 705/37, 705/39, 26; 709/203, 213; 707/203, 200; 845/326, 327

(56) References Cited

U.S. PATENT DOCUMENTS

| | | | |
|---|---|---|---|
| 5,586,312 | * | 12/1996 | Johnson et al. ........................ 707/10 |
| 5,680,610 | * | 10/1997 | Smith et al. ............................ 707/10 |
| 5,724,424 | * | 3/1998 | Gifford .................................... 705/79 |
| 5,802,291 | * | 9/1998 | Balick et al. ............................ 717/2 |
| 5,809,483 | * | 9/1998 | Broka et al. ............................ 705/37 |
| 5,913,202 | * | 6/1999 | Motoyama .............................. 705/35 |
| 5,923,833 | * | 7/1999 | Freund et al. .......................... 714/19 |
| 5,958,004 | * | 9/1999 | Hellan et al. .......................... 709/101 |
| 5,996,001 | * | 11/1999 | Quarles et al. ........................ 709/203 |
| 6,035,301 | * | 3/2000 | Siegel et al. ........................... 707/102 |
| 6,064,981 | * | 5/2000 | Barni et al. ............................. 705/26 |
| 6,076,108 | * | 6/2000 | Courts et al. .......................... 709/227 |
| 6,115,744 | * | 9/2000 | Robins et al. ......................... 709/227 |
| 6,141,679 | * | 10/2000 | Schaefer et al. ...................... 709/201 |

OTHER PUBLICATIONS

Kunkel et al, "System optimization for OLTP workstation", IEEE Micro, pp. 56–64, 1999.*
Rao et al, "On line transation system for operation support", Proc. of ICA IEEE pp. 363–368, Jun. 2000.*
Chandra et al, "Time lag duplexing a fault tolerance techniques for online transaation processing system", IEEE, pp. 202–207, 1997.*

\* cited by examiner

Primary Examiner—Mark R. Powell
Assistant Examiner—Anil Khatri
(74) Attorney, Agent, or Firm—Charles A. Johnson; Mark T. Starr; Nawrocki, Rooney & Sivertson, P.A.

(57) ABSTRACT

Apparatus and method for the automatic generation of code which will enable a user-developed client application to initiate and participate in a transaction across multiple hardware platforms. In a preferred embodiment, one of the platforms is an enterprise OLTP (On-Line Transaction Processing) system, and another one of the platforms executes within the Microsoft ® Transaction Server (MTS).

19 Claims, 5 Drawing Sheets

DEVELOPMENT SYSTEM FOR AUTOMATICALLY ENABLING A SERVER APPLICATION TO EXECUTE WITH AN XATMI-COMPLIANT TRANSACTION MANAGER MANAGING TRANSACTIONS WITHIN MULTIPLE ENVIRONMENTS

CROSS REFERENCE TO CO-PENDING APPLICATIONS

The present application is related to U.S. patent application Ser. No. 09/164,932 filed Oct. 1, 1998, entitled "A MULTI-CLIENT USER-CUSTOMIZED DCOM GATEWAY FOR AN OLTP ENTERPRISE SERVER APPLICATION", application Ser. No. 09/164,759, filed Oct. 1, 1998, entitled "METHODS AND APPARATUS FOR ENABLING A COMPONENT IN A FIRST TRANSACTION PROCESSING ENVIRONMENT TO ACCESS A RESOURCE IN ANOTHER ENVIRONMENT THAT IS UNDER THE CONTROL OF AN XATMI-COMPLIANT TRANSACTION MANAGER", and application Ser. No. 09/164,908, filed Oct. 1, 1998, entitled "AN AUTOMATED DEVELOPMENT SYSTEM FOR DEVELOPING APPLICATIONS THAT INTERFACE WITH BOTH DISTRIBUTED COMPONENT OBJECT MODEL (DCOM) AND ENTERPRISE SERVER ENVIRONMENTS", all of which are assigned to the assignee of the present invention and incorporated herein by reference.

BACKGROUND OF THE INVENTION

1. Field of the Invention

The present invention is directed to distributed transaction processing systems and more specifically relates to a system for automatically configuring a user-developed application so that the application is capable of requesting execution of a transaction across several hardware platforms.

2. Description of the Prior Art

On-line transaction processing (OLTP) is a technology that has been used successfully for business-critical application by large enterprises for many years. With OLTP, users at terminals send messages to application programs, and these in turn update databases in real time. This is in contrast to batch or queued processing of transactions where the transactions are processed at a later time.

An example of an OLTP application is an airline reservation system, When a travel agent sends a request to reserve a seat on a plane, a database is updated accordingly, and a confirmation message is sent back to the agent's terminal. All of the tasks are part of a single transaction, and many agents can perform transactions at the same time. OLTP systems are typically used in environments that support large numbers of users, all accessing the same database, with hundreds and sometimes thousands of transactions taking place each second. The systems are typically based on large enterprise servers that can provide the performance, reliability, and data integrity demanded by these environments.

A transaction may be thought of as a set of actions performed by a transaction processing system wherein the actions together exhibit the properties of Atomicity, Consistency, Isolation, and Durability (ACID). The following definitions are given in *Transaction Processing: Concepts and Techniques,* by Jim Gray and Andreas Reuter, Morgan Kaufmann Publishers, Inc., 1993, p.6:

Atomicity. A transaction's changes to the state are atomic; either all happen or none happen. These changes include database changes, messages, and actions on transducers.

Consistency. A transaction is a correct transformation of the state. The actions taken as a group do not violate any of the integrity constraints associated with the state. This requires that the transaction be a correct program.

Isolation. Even though transactions execute concurrently, it appears to each transaction, T, that other transactions execute either before T or after T, but not both.

Durability. Once a transaction completes successfully, (commits), the state of the data is changed to reflect the successful completion of the transaction, and the state of the data will survive system failures.

To maintain the properties identified above, at the beginning of processing a transaction, a transaction processing application program typically invokes some form of begin-transaction function to indicate that processing of a transaction has begun. This operation is typically logged to an audit file to demarcate the operations associated with the particular transaction. Following the begin-transaction function, the other functions associated with the application-defined transaction are performed and are also logged to an audit file. If all operations associated with a transaction complete successfully, a commit function is invoked to make permanent any state changes that have occurred as a result of the transaction. The commit operation is logged to the audit file to indicate that all operations have completed successfully. If an error occurs during processing of the transaction and a commit operation is not performed, a rollback function is invoked to undo the effects of the operations performed to that point in processing the transaction.

Distributed Transaction Processing (DTP) is a form of on-line transaction processing that allows a single transaction to be performed by multiple application programs that access one or more databases on one or more computers across a network. This type of transaction, in which multiple application programs cooperate, is called a distributed transaction. Using DTP, for example, related databases at regional and branch locations can be synchronized. DTP also facilitates transaction processing across multiple enterprises. For example, DTP can be used to coordinate the computers of manufacturers and suppliers, or to coordinate the computers of enterprises in related industries, such as the travel agency, airline, car rental, and hotel industries.

Transaction processing in a distributed environment can be either non-global or global. In a non-global transaction, the same work takes place as in a traditional transaction, but the work is distributed in a client/server manner. For example, a travel agent may request an airline reservation via a client application program that has a graphical user interface (GUI). The client application program communicates with a server application program that manages the reservation database. The server application program updates the database, commits or aborts its own work, and returns information to the client application program, which notifies the travel agent.

A global transaction consists of multiple, coordinated database updates, possibly occurring on different computers. Global transactions are used when it is important that all databases are synchronized so that either all updates are made or none are made. Continuing with the previous example, the travel agent may also need to reserve a rental car and hotel room. The customer who is traveling wants to make sure that all reservations are coordinated; if a flight is unavailable, the hotel and car reservations are not needed. For the purpose of illustrating a global transaction, the airline, car, and hotel databases are on different transaction processing systems.

The global transaction begins when the travel agent requests the reservation from a workstation client application program with a graphical user interface. The client program contacts three server application programs on different transaction processing systems. One server program books a flight, another reserves a car, and the third makes a hotel reservation. Each of the server application programs updates its respective database. The transactions processed by each of the server application programs may be referred to as subordinate transactions of the global transaction. A global transaction manager coordinates the updates to the three databases, and a subordinate transaction manager on each of the individual transaction processing systems coordinates locally with the server application programs. The server application programs return information to the client application program.

A major advantage of global transaction processing is that tasks that were once processed individually are processed as a group, the group of tasks being the global transaction. The database updates are made on an all-or-nothing basis. For example, if an airline seat is not available, the hotel and car reservations are not made. Thus, with a global transaction, tasks that were once performed independently may be coordinated and automated.

As with non-global transactions, global transactions must possess the ACID properties. In order to preserve the ACID properties for a global transaction, the commit processing is modified to a two-phase commit procedure. Under a two-phase commit, a global transaction manager first requests that each of the subordinate transaction managers prepare to commit their updates to the respective databases. If all the local transaction managers respond that they are prepared to commit, the global transaction manager sends a commit request to the local transaction managers. Thus, the two parts of the two-phase commit process are (i) prepare to commit the database updates, and (ii) commit the database updates. If any one of the transaction managers is unable to prepare to commit, the entire global transaction is aborted and each transaction manager performs a rollback function to undo the processing that may have occurred up to that point. In short, the two-phase commit process ensures that multiple databases participating in a single global transaction are synchronized - either all database updates requested by the global transaction are made or, in the event of system or component failure, none are made. Two-phase commit guarantees global data integrity and preserves the ACID properties in a DTP environment.

An industry consortium of users and vendors, known as X/Open™, has developed a model architecture for DTP, referred to as the X/Open Distributed Transaction Processing model. The X/Open DTP model is a software architecture that allows multiple application programs to share resources provided by multiple resource managers, and allows their work to be coordinated into global transactions. The X/Open DTP model comprises a number of components, application programming interfaces, and communications interfaces.

FIG. 1 illustrates a client system 10 and a server system 12 both constructed in accordance with the X/Open DTP model architecture. Referring to the client system 10 as an illustrative example, the components of the X/Open DTP model include an application program (AP) 14, one or more resource managers (RMs) 16, a Transaction Manager (TM) 18, and a Communications Resource Manager (CRM) 20.

An Application Program (AP), such as client application program 14, is a user-defined software component that defines global transaction boundaries and specifies actions that constitute global transactions. It also provides access to one or more resources that are required by a transaction. In a global transaction, two or more APs perform their individual functions which, when combined, make up the global transaction. One of the APs will be the transaction coordinator, that is, the AP that starts and finishes the global transaction. The other APs will be subordinate.

A Resource Manager (RM) 16 provides access to a resource for the AP 14. The X/Open DTP model permits multiple resource managers. Database management systems and file access systems are examples of system software components that act as RMs.

The APs begin and end transactions under the control of the Transaction Manager (TM) 18. The TM 18 is a system software component that assigns transaction identifiers to global transactions, monitors their progress, coordinates their completion, and coordinates failure recovery. The TM enforces the transaction property of atomicity. In a global transaction, the TM adheres to the two-phase commit transaction processing protocol.

The CRM 20 controls communication between the AP 14 and other APs (e.g. AP 40) that are participating in global transactions, as well as between the TM 18 and TMs on separate data processing systems (e.g. the TM of system 12).

The X/Open DTP model provides a number of standard application programming interfaces that enable application programs to interact with system components to conduct global transactions. These application programming interfaces include one or more AP-RM interfaces 22, an AP-TM interface 24, an AP-CRM interface 26, an RM-TM interface 28, and a TM-CRM interface 30.

The AP-RM interfaces 22 provide the AP 14 with access to resources (such as databases) through their respective RMs 16. These interfaces are not specifically defined by the X/Open DTP model, as a number of different resources can exist on a system. Examples of AP-RM interfaces include the Structured Query Language (SQL) and the Indexed Sequential Access Method (ISAM).

The AP-TM interface 24 is provided by the TM 18 to define global transaction boundaries. The AP-TM interface is also referenced as the TX interface. Further information on the TX interface is available in Distributed Transaction Processing: The TX (Transaction Demarcation) Specification, X/Open Company Limited, U.K., (1992). The TX interface is described in somewhat greater detail below.

The AP-CRM 26 interfaces are provided by the CRM 20 to the AP 14. The X/Open DTP model supports the following three AP-CRM interfaces: the Tx RPC interface, the XATMI interface, and the CPI-C interface. Each of these interfaces can be used to enable communication between APs that utilize the same interface. Although the XATMI interface is discussed below in somewhat greater detail, further information on the XATMI interface is available in Distributed Transaction Processing: The XATMI Specification, X/Open Company Limited, U.K., (1993) (hereinafter "the XATMI Specification"), which is incorporated herein by reference in its entirety.

The TM-RM interface 28 is used for purposes of transaction control (preparing, committing, or rolling-back). The TM-RM interface 28 is described further in XA Interface, Distributed Transaction Processing: The TX (Transaction Demarcation) Specification, X/Open Company Limited, U.K. (1992). The TM-CRM interface 30 is described further in X/Open Preliminary Specification—Distributed Transaction Processing: The XA+ Specification, X/Open Company Limited, U.K. (1993).

In addition to the foregoing application programming interfaces, systems that implement the X/Open DTP model can communicate with each other using an industry standard communications protocol know as Open Systems Interconnection (OSI) Transaction Processing (TP) (ISO/IEC 10026) ("the OSI TP Standard"), all parts of which are hereby incorporated by reference in their entireties. The OSI TP Standard defines a machine independent protocol that supports communications between computers in a transaction processing system. An industry standard CRM-OSI TP programming interface, called XAP-TP 32, provides an interface between a CRM 20 and an OSI TP protocol machine 34 that conforms to the OSI TP Standard. ISO/IEC 10026-3, Information Technology - Open Systems Interconnection - Distributed Transaction Processing - Part 3: Protocol Specification ("the OSI TP Protocol Specification") defines the state transitions and protocols that a conformant OSI TP protocol machine must generate in processing OSI TP service requests in accordance with the OSI TP Standard. The XAP-TP programming interface is specified in X/Open ACSE/Presentation: Transaction Processing API (XAP-TP) CAE specification ("the XAP-TP Specification"). The XAP-TP Specification defines the interface, including functions, parameters, and errors, that controls the use of a conformant OSI-TP protocol machine. An implementation of lower layer communication protocols 36 handles the low-level communication chores needed to send information between systems 10 and 12 via a network 38. These lower layer protocols can, for example, be OSI or TCP/IP. The X/Open DTP model does not define an interface to these lower layers.

The XATMI API provides a set of function calls, collectively referred to as the tp*() function calls, that can be called to perform various functions. Table 1 is a list of these functions, callable from any C language application program.

TABLE 1

| Name | Service Request (Function Calls) of the XATMI API. Description |
|---|---|
| | Typed Buffer Functions |
| tpalloc() | Allocate a typed buffer. |
| tpfree() | Free a typed buffer. |
| tprealoc() | Change the size of a typed buffer. |
| tptypes() | Determine information about a typed buffer. |
| | Function for Writing Service Routines. |
| tpservice() | Template for service routines. |
| tpreturn() | Return from a service routine. |
| | Functions for Dynamically Advertising Service Names |
| tpadvertise() | Advertise a service name. |
| tpunadvertise() | Unadvertise a service name. |
| | Functions for Request/Response Services |
| tpcall() | Send a service request. |
| tpcall() | Send a service request and synchronously awaits its reply. |
| tpcancel() | Cancel a call descriptor for an outstanding reply. |
| tpgetrply() | Get a reply from a previous service request. |
| | Functions for Conversational Services |
| tpconnect() | Establish a conversational service connection. |
| tpdiscon() | Terminate a conversational service connection abortively. |
| tprecv() | Receive a message in a conversational connection. |
| tpsend() | Send a message in a conversational connection. |

Each of the foregoing XATMI API requests has a formal syntax that specifies that format and arguments of each request. The formal syntax for each request is specified in the XATMI Specification.

Microsoft Corporation has recently introduced a product called Microsoft® Transaction Server (MTS) that provides a component-based programming model and execution environment for developing and deploying distributed applications. "Microsoft," "windows," and "Windows NT" are registered trademarks of Microsoft Corporation.

MTS allows users to build three tier applications. Client applications may be either DCOM or IIS applications. MTS becomes the middle tier supporting reusable business logic, and the data store becomes the third tier. The technology is based on the idea of building reusable components in the form of COM objects that comprise all business logic. Examples of such components include the following types: Query: data inputted, then the component binds to the data store to get the information; Update; execute a transaction and send a message to update a data base.

In the MTS environment, a client application requests an instance of an MTS component to perform a given task. The MTS component provides the business logic associated with that task. When a client application makes a request for a component instance, MTS instantiates the MTS component and returns a reference to the client application. Every instance of an MTS component has an associated context object that holds information about the MTS component. The context object of each MTS component exposes an IObjectContext interface comprising a number of methods. Two methods relating to transaction processing are IObjectContext::SetComplete () and IObjectContext::SetAbort (). An MTS component invokes SetComplete () when it has successfully completed executing its work. SetAbort () is invoked if the work is not completed successfully. A global method provided by MTS, called GetObjectContext (), is used to obtain a reference to the IObjectInterface of a context object.

MTS components (i.e., COM objects) are written as single thread units and the MTS executive handles any concurrency issues. MTS enables developers to collect a series of such components into a package to make deployment easier. Unlike with the X/Open DTP model, the MTS component developer does not have to worry about how components will be combined into global transactions. MTS components are written as all-encompassing units and are configured as either requiring or supporting a transaction, or having non-transactional properties. When an MTS component is instantiated, MTS validates its transactional properties, and if the MTS component is configured to be transactional, MTS instantiates the component with those properties. An MTS component that is instantiated with transactional properties will enlist (i.e., join) in a transaction, if one is in progress.

A Distributed Transaction Coordinator (MS DTC) within the MTS environment controls the enlistment of components in global transactions, and also coordinates transaction commitment. The MS DTC implements two-phase commitment processing. Unlike the X/Open DTP model, however, MTS transactions are not demarked by the client application as having a beginning and end. Rather, through the enlistment process, the life of a transaction is controlled by the MS DTC.

In any transaction processing system, each resource in the system is controlled by a resource manager that declares itself by contacting the local transaction manager. In the MTS environment, the local transaction manager is the MS DTC, and the process by which a resource manager declares itself to the MS DTC is referred to as enlistment (to be distinguished from enlistment in a transaction). After a resource manager has enlisted with the MS DTC, it waits for requests from an executing application. When a request associated with a new transaction arrives, the resource manager must also then enlist in that transaction. This ensures that the resource manager will get callbacks (i.e., indications) from the MS DTC when the transaction commits or aborts.

The MS DTC supports transactions that are distributed across two or more Windows® 95 or Windows NT® systems. Each system has a local a transaction manager - the MS DTC. All components and resource managers communicate with their local transaction managers. The transaction managers cooperatively manage transaction protocols that span systems using OLE Transaction Protocols. Further information concerning the Microsoft Transaction Server environment can be found in Database Workshop: Microsoft Transaction Server 2.0, Roger Jennings ed., Sams Publishing, 1997, and also at the Microsoft Corporation web site.

Currently, MTS interoperability for heterogeneous hosts exists through Microsoft's COMTI (COM Transaction Interface) for IBM's IMS or CICS transactions, through third party ODBC (Open Data Base Connectivity) for connection to remote host's databases, or via the XA Mapper.

COMTI allows exiting Cobol programs running on an IBM mainframe to be accessed by new window-based clients. ODBC allows access to various databases (Oracle, Informix, SQL Sequel server) by MTS components. The XA Mapper allows client applications that communicate with X/Open-compliant transaction managers to map their XA protocol to MTS's native OLE transaction protocols for inclusion of MTS controlled resources.

Unfortunately, these interoperability solutions exclude a large class of existing transaction processing systems - those that have been built according to the X/Open DTP model and that use the XATMI programming interface as the interface between an application program and a resource. Servers in these systems add business logic to control data bases which may be accessed by remote clients. The transaction managers in X/Open DTP-based systems control the coordination of transactions and the routing of messages. They also control rollback and recovery of data and synchronization of remote data managers.

The MS DTC, which provides the transaction manager function in an MTS environment, cannot currently interoperate with resources on remote servers controlled by an X/Open XATMI-compliant transaction manager. The MS DTC is not XATMI-compliant. Servers controlled by XATMI-compliant transaction managers therefore cannot participate in global OLE transactions managed by an MS DTC. Given the large installed base of client/server applications that are built upon an X/Open XATMI-compliant transaction manager, it would be desirable to provide methods and apparatus that enable an MS DTC to include such servers in a global transaction that it controls. More broadly, it would be desirable to provide the ability for any transaction processing environment that does not employ an XATMI-compliant transaction manager to be able to access, as part of a global transaction in that environment, a resource on a remote server in another environment that does operate under the control of an XATMI compliant transaction manager. The present invention satisfies that need.

In order for a COM/DCOM server application to be enabled to participate in, and initiate, a transaction which will be performed across several platforms, specific code must be added to the service. This requires knowledge on how the MTS system enforces the two-phase commit protocol. The average user developing a client application does not have this knowledge. The average user will only know that there is a specific OLTP service on the enterprise server which he or she wants to access, and further knows that there are one or more resources registered under the MTS system that are to be accessed within the same transaction.

SUMMARY OF THE INVENTION

The present invention overcomes many of the disadvantages associated with the prior art by providing an apparatus and method for the automatic generation of computer source code which will enable a user-developed client application to initiate and participate in a transaction across multiple hardware platforms. In a preferred embodiment, one of the platforms is an enterprise OLTP system, and another one of the platforms executes within the Microsoft Transaction System (MTS).

In a preferred embodiment of the present invention, a person familiar with an OLTP system develops an OLTP service on a enterprise system. This service is designed to perform one or more parts of a transaction. As an example, a service may require a name and credit card as input. The service utilizes this input information to book a hotel and plane reservation, and provides confirmation numbers as output.

A user then develops a client application on a personal computer (PC). This client may be a C, C++ or a Visual Basic Program, or may be an Active Server Page (ASP) which is accessible from a web browser. The client is developed to perform a transaction which accesses a specific OLTP Service on the enterprise system (such as the Unisys 2200), and further accesses certain applications operating within the Microsoft Transaction Server (MTS) environment.

In order for this client application to be enabled to participate in, and initiate a transaction which will be performed across multiple hardware platforms, specific source code must be added to the client application. This requires knowledge of how the MTS environment enforces the two-phase commit protocol. The average user developing a client application does not have this knowledge, and only knows that there is a specific OLTP service on the enterprise server which he or she wishes to access, and further knows that there are one or more resources registered under the MTS system that are to be accessed within the same transaction. To make the development of the client application much easier, a tool was created to generate the specific code needed to accomplish the transaction. This tool, which is integrated into the "DGateAce" environment, is the subject of the present invention. The "DGateAce" environment is further described in a co-pending application entitled, "AN AUTOMATED DEVELOPMENT SYSTEM FOR DEVELOPING APPLICATIONS THAT INTERFACE WITH BOTH DISTRIBUTED COMPONENT OBJECT MODEL (DCOM) AND ENTERPRISE SERVER ENVIRONMENTS", The interface code generated by the tool of the present invention receives a request from the client application, then interfaces with the requested enterprise service via a gateway server dynamic link library and a resource dispenser. The resource dispenser coordinates the MTS and enterprise OLTP server portions of the transaction so that a two-phase commit protocol is achieved. Either all parts of the requested transaction are actually performed, or none of the parts of the transaction are performed. An error occurring on either system will cause the portions of the transaction performed on the other system to be rolled back (not committed).

The DGateAce program generates all code used for the enterprise server and Object Context initialization, and for the registration of status. The user is still required to add code to make the calls to the MTS services, and to make the calls to the Object Context to report status from the MTS calls. However the user is able to pattern the calls after what has already been automatically generated by DGateAce. Therefore, the code development process is greatly simplified.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities.

Furthermore, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, it should be kept in mind the distinction between the method operations in operating a computer and the method of computation itself. The present invention related to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms present herein are not inherently related to a particular computer system or other apparatus. In particular, various general purpose computer systems may be used with computer programs written in accordance with the teachings of the present invention, or it may prove more convenient to construct more specialized apparatus, to perform the required method steps. The required structure for such machines will be apparent from the description given below.

Figure 1:
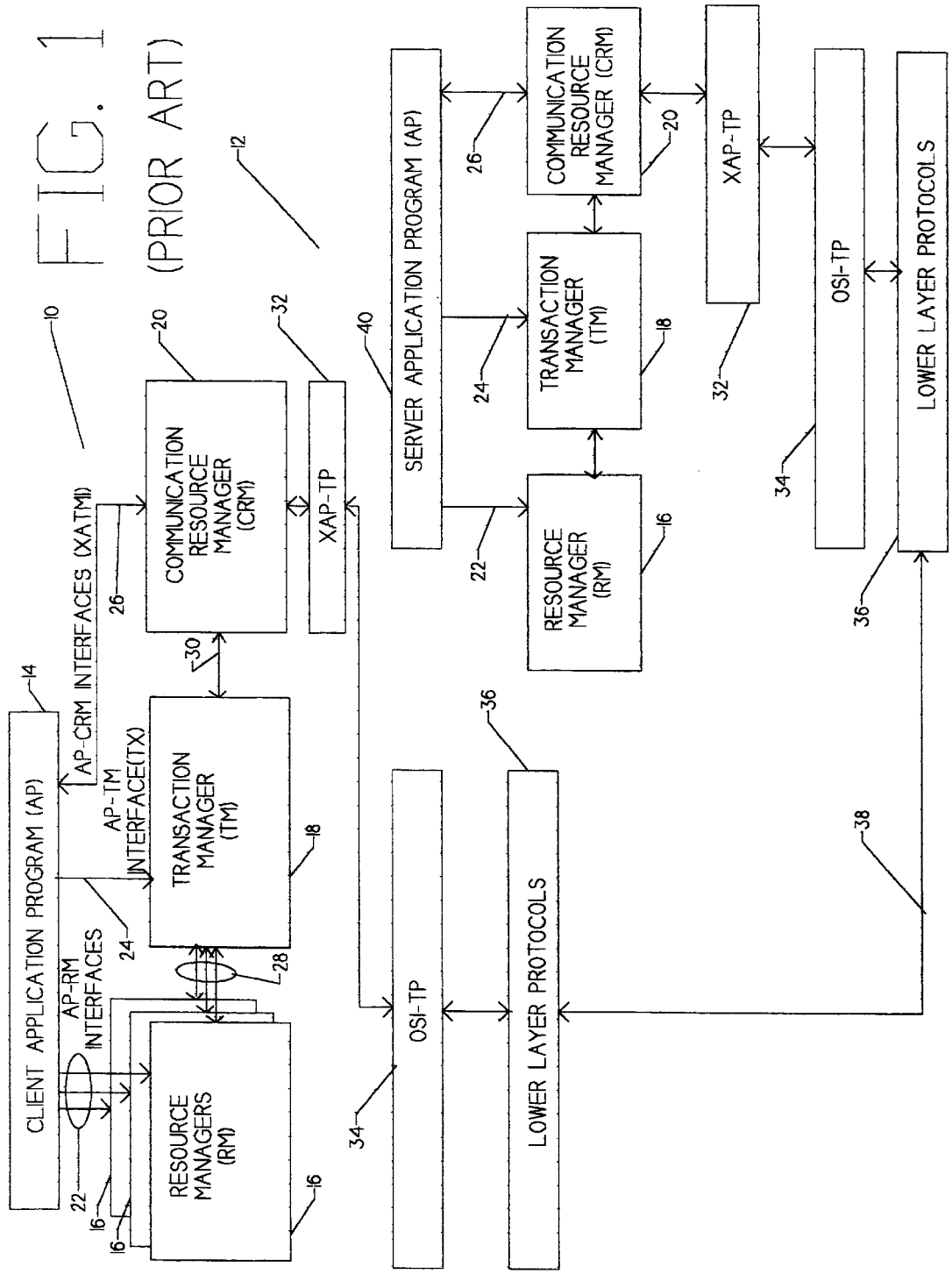
FIG. 1 is a block diagram illustrating the X/Open Distributed Transaction Processing (DTP) model architecture for distributed transaction processing systems.

FIG. 1 is a block diagram illustrating the X/Open Distributed Transaction Processing (DTP) model architecture for distributed transaction processing systems, and is discussed in detail in the background section listed above.

Figure 2:
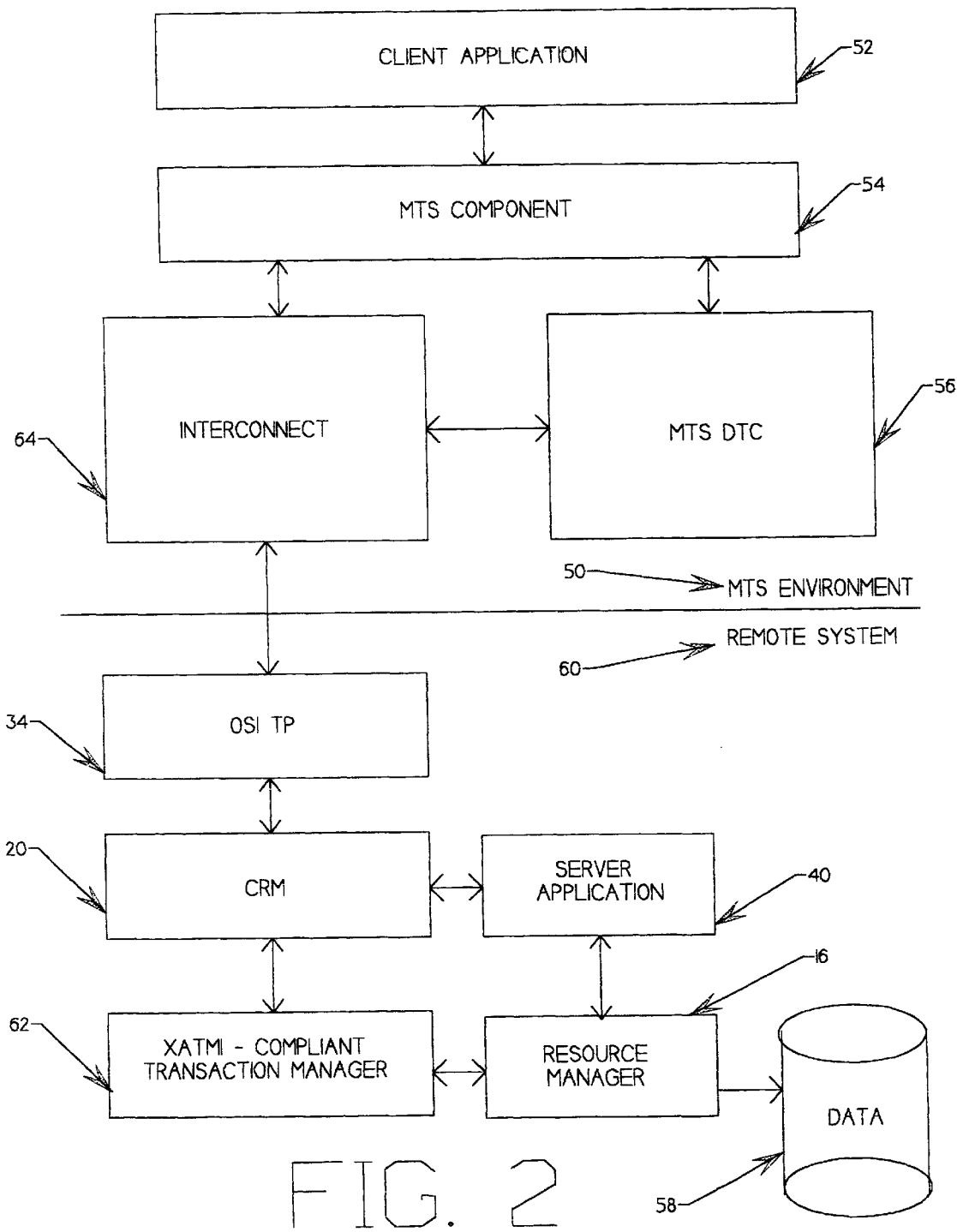
FIG. 2 is a block diagram illustrating a Microsoft Transaction Server (MTS) environment.

FIG. 2 is a block diagram illustrating a Microsoft Transaction Server (MTS) environment coupled to a remote enterprise On-Line Transaction Processing (OLTP) system. The present invention describes apparatus and method for the automatic generation of computer source code which will enable a user-developed client application to initiate and participate in a transaction involving an MTS environment coupled to an enterprise OLTP system.

MTS is a runtime environment that executes under the Microsoft Windows NT operating system, and also, in a more limited fashion, under the Microsoft Windows 95 operating system. An MTS environment typically includes a client application 52, representing the first tier of a traditional three-tier transaction processing model. The client application 52 usually provides a user interface and may also perform some of the overall logic of the application. An application's business logic is implemented in the form of one or more MTS components (e.g., component 54). MTS components are written as single thread units, and the MTS executive handles any concurrency issues. A series of MTS components can be grouped into a package for easier deployment and use. An MTS component developer can configure an MTS component as either requiring or supporting a transaction. An MTS component that is so configured, will automatically join a transaction, if one is in progress, under the control of a Distributed Transaction Coordinator (MS DTC) 56 in the MTS environment. The MS DTC controls the participation of MTS components in transactions and coordinates transaction commitment in accordance with a two-phase commitment process. MTS components can request resources from one or more resource managers (not shown) within the MTS environment. A resource manager controls access to a particular resource, such as a database. In a typical MTS environment, the MTS component 54, the MS DTC 56, and one or more resource managers (not shown) communicate using DCOM protocols.

In this embodiment, the methods and apparatus of the present invention enable the MTS component 54 to request, as part of a global transaction coordinated by the MS DTC 56 (which is not XATMI-compliant), a resource (e.g., data from database 58) on a remote server 60 that is under the control of an XATMI- compliant transaction manager 62 outside of the MTS environment. Such a remote server might be constructed, for example, in accordance with the X/Open DTP model, as is the remote server 60 of this example. That is, the remote server 60 is architected and operates in a manner similar to the exemplary server 12 of the X/Open DTP model system of FIG. 1. Remote servers of this type will communicate with other servers in accordance with a bi-directional two-phase commitment communications protocol, such as the OSI TP Protocol Specification.

In a preferred embodiment, the methods and apparatus of the present invention are implemented, as shown in FIG. 2, in the form of an interconnect 64. This interconnect receives XATMI service requests (e.g., tpcall, tpacall, tpconnect, etc.) from the MTS component via an XATMI interface, and receives directives for a given global transaction (e.g., prepare, commit, abort, etc.) from the MS DTC 56. As described hereinafter in greater detail, the interconnect 64 of the present invention translates these requests and directives into corresponding service requests of the bi-directional two-phase commitment communications protocol employed by the remote server 60 (e.g., the OSI TP protocol Specification), and coordinates the processing of those service requests with the processing of corresponding events in the MTS environment. In this manner, the remote server 60 appears as a local resource to the MS DTC 56. The interconnect 64 communicates with the MS DTC 56 using the native OLE transaction protocol of the MTS environment. As used herein, the terms "XATMI", "XATMI interface" and "XATMI service request" are intended to encompass the interface and service requests described in the XATMI Specification, as well as other versions, variations, predecessors, or modified forms thereof, whether or not known by the same name.

Figure 3:
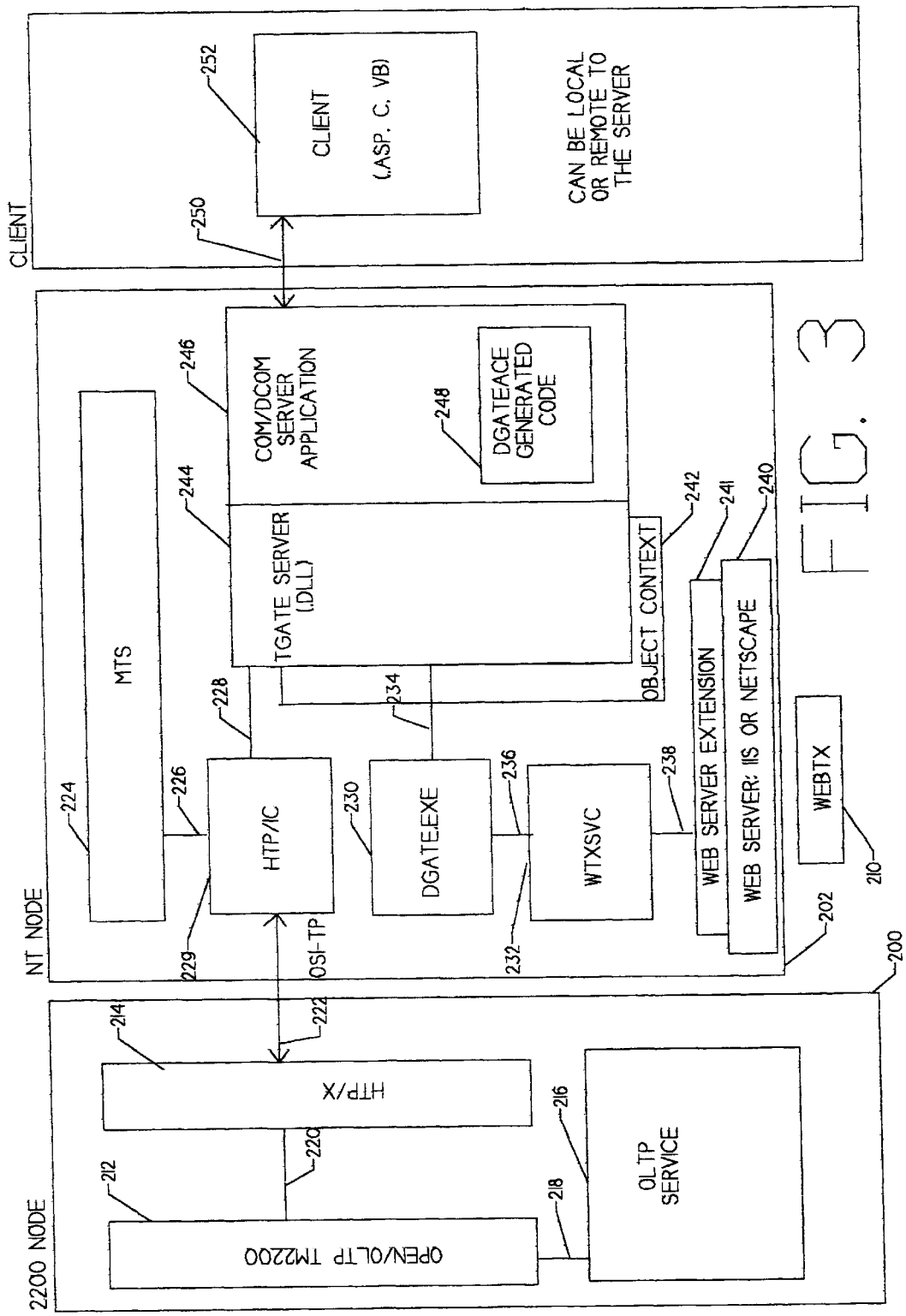
FIG. 3 is a block diagram illustrating the computing environment in which the present invention operates.

FIG. 3 is a block diagram illustrating the computing environment in which the present invention operates. The computing environment of FIG. 3 is termed a "transactional" DGate environment, because a single transaction may be performed across two different types of systems. One or more parts of the transaction are performed on an enterprise server, such as a Unisys 2200 node 200 using an OLTP service 216 being coordinated by the OLTP TM2200 transaction manager 212. Additionally, one or more other parts of the transaction may be performed on the MTS system 224 residing on a Microsoft NT node 202, and may utilize resources registered within the Microsoft Environment. These portions of the transaction are coordinated by the HTP/ic component 229. The HTP/ic component 229, which is referred to as a "resource dispenser", further coordinates the MTS and 2200 portions of the transaction so that a two-phase commit protocol is achieved. The HTP/ic component 229 is connected to the OPEN/OLTP TM2200 component 212 via the enterprise-based HTP/x component 214. The HTP/ic component is also connected to the MTS component 224 via interface 226, and to the TGateServer.dll component 244 via interface 228. Either all parts of the transaction are actually performed, or none of the parts of the transaction are performed. An error occurring on either system causes the portions of the transaction performed on the other system to be rolled back (not committed). The ability to coordinate MTS portions of a transaction with portions of a transaction performed on an enterprise OLTP server so that the transaction adheres to OLTP principles such as two-phase commit (that is, "XATMI-Compliant") is described in the Application entitled "METHODS AND APPARATUS FOR ENABLING A COMPONENT IN A FIRST TRANSACTION PROCESSING ENVIRONMENT TO ACCESS A RESOURCE IN ANOTHER ENVIRONMENT THAT IS UNDER THE CONTROL OF AN XATMI-COMPLIANT TRANSACTION MANAGER", which was filed in May, 1998.

The WebTx Monitor (known as WTXSVC in a Windows NT environment) 232 communicates with the Web Server via interface 238, and the DGate Gateway 230 via interface 236. The WTXSVC Monitor 232 functions as the WebTx administrative tool. One function of the WTXSVC Monitor 232 is to start and stop the DGate gateway 230 as needed.

The WebTx Web Server component 241, is a run-time extension of the Web Server 240 (such as Netscape FastTrack, Netscape Enterprise, or Microsoft IIS). The function of the Web Server Extension 241 is to intercept requests intended for WebTx 210, and instead route the requests to the Gateway 230. The Web Server Extension 241 will also interpret the response from the Gateway 230, and route the reply. The Web Server Extension 241 is connected to the WTXSVC Monitor 232 via interface 238.

The DGate Gateway 230 receives requests from the Web Server Extension 241 via the WTXSVC Monitor 232. This typically involves transforming a request (such as a URL from a Web Browser or remote procedure calls RPC's from a DCOM client) into a format which is understandable by a Distributed Transaction Processing System such as a Unisys 2200 Enterprise System 200. The DGate Gateway 230 also transforms data returned from the Distributed Transaction Processing System 200 into a formatted response which is returned to the requestor.

The present invention is best described in terms of the development steps performed in order to create the enterprise (2200) and MTS (NT) services, and to further create the client. A person familiar with the enterprise OLTP system 200 first develops an OLTP service 216 on the enterprise server node 200. This service 216 is designed to perform one or more parts of a transaction. For example, the service may require a name and credit card number input from a user, utilizes this user input information to book a hotel and plane reservation, then provides the user with confirmation numbers for the hotel and plane reservations. Input parameters are received from the NT node in a particular format as determined by an "input view file", whereas the output parameters, if any, are provided to the NT node in the format defined by the "output view file". More specifically, the input and output view file determine the offset locations, the size, and the type of, input and output parameters within the input and output buffers. An OLTP service 216 may have only an input view, may have both input and output view which are different, or may have input and output views which are the same. After the 2200 service is developed, the view files are copied to a specified location on the NT node 202.

A user then develops a client application 252 on a PC 204. This client 252 may be a C, C++, Visual Basic Program, or may be an Active Server Page (ASP) which is accessible from a web browser. The client application 252 is developed to perform a transaction which will access a specific OLTP service 216 on the Unisys 2200 enterprise server 200, and further accesses certain applications residing within the MTS environment 224. The user knows the name of the OLTP Service 216, and further knows the name and location of the view files which have been copied to a specified location on the NT node 202.

The user developing the PC client application 252 uses the DGateAce tool, to generate the code shown as "DGateAce generated code" 248 on FIG. 3. The "DGateAce generated code" 248 is part of the overall COM/DCOM Server Application 246. This COM/DCOM Server Application 246 is the code which receives requests from the client 252 and which interfaces via the TGate_Server.dll 244 with the HTP/ic component 229, in order to gain access to the 2200 service 216.

Figure 4:
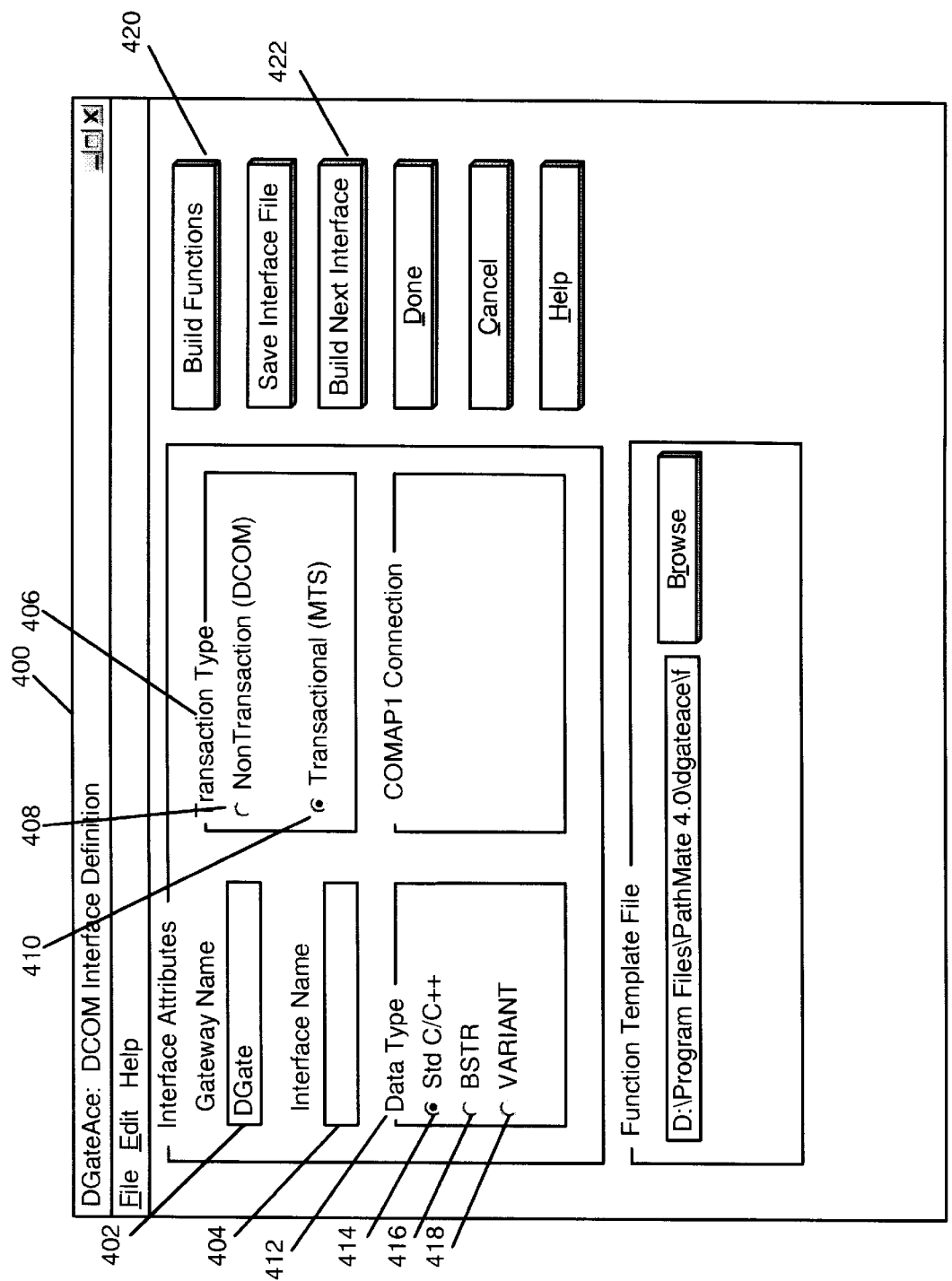
FIG. 4 is an illustration of the first DGateAce input screen encountered by a user when generating the Transactional Gateway (TGATE) code.

FIG. 4 is an illustration of the first DGateAce input screen encountered by a user when generating the Transactional Gateway (TGATE) code. The DGateAce program, also described in a co-pending application, Ser. No. XX/XXX, XX entitled, "AN AUTOMATED DEVELOPMENT SYSTEM FOR DEVELOPING APPLICATIONS THAT INTERFACE WITH BOTH DISTRIBUTED COMPONENT OBJECT MODEL (DCOM) AND ENTERPRISE SERVER ENVIRONMENTS", is utilized by the present invention to generate the necessary code. The present invention can be distinguished from the aforementioned co-pending application in that the DGateAce tool described in the co-pending application generates source code for transactions that are performed exclusively on a OLTP enterprise system, while DGateAce tool in the context of the present invention generates code that performs a single transaction across two different types of systems (namely a enterprise OLTP system AND a Microsoft Transaction Server system).

Within the first DGateAce screen 400, a user must specify a Gateway name 402 to determine which TGate_Server instance will receive a request. A Microsoft Windows NT Node may have several instances of a TGate_Server running, which will all be named.

The interface name 404 is an arbitrary name selected by the user. The client does not have to be aware of the Interface name 404. This name 404 determines which functions will be built together as a code block, as will be discussed below.

The screen of FIG. 4 further includes a pushbutton control 406 to select between the Transactional and Non-Transactional mode of operation. If "Non-Transactional" pushbutton 408 is selected, the regular DGateAce functionality described in the co-pending application, Ser. No. XX/XXX,XX entitled, "AN AUTOMATED DEVELOPMENT SYSTEM FOR DEVELOPING APPLICATIONS THAT INTERFACE WITH BOTH DISTRIBUTED COMPONENT OBJECT MODEL (DCOM) AND ENTERPRISE SERVER ENVIRONMENTS", will be invoked. Selecting the "Transactional" pushbutton 410 invokes the functionality associated with the present invention.

The user further selects the type of buffer 412 which will be received from the client. This will be determined by the type of client. For a C or C++ client, the user selects "Std C/C++" 414. For a Visual Basic client, the user selects "BSTR" 416, and for an Active Service Page, the user selects the type of "Variant" 418.

When all of the fields have been supplied by the user, the user selects the "Build Functions" button 420 which sets up an interface on the NT node. Setting up the interface actually involves initialization of a data structure. This data structure supports the various functions which are part of the interface, and which are specified using the screen shown in FIG. 5, discussed below.

Figure 5:
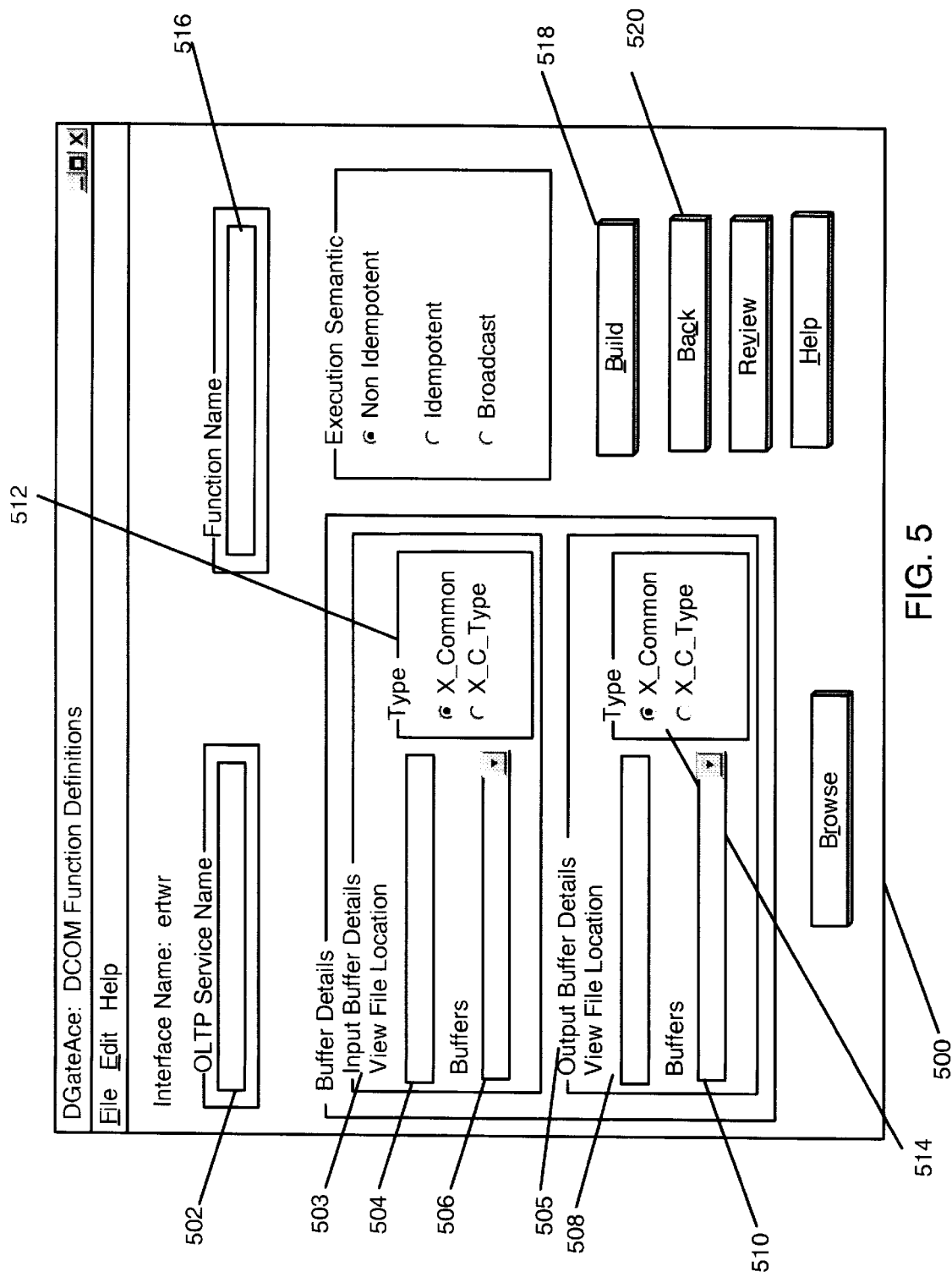
FIG. 5 is an illustration of the second DGateAce input screen encountered by a user when generating the Transactional Gateway (TGATE) code.

FIG. 5 is an illustration of the second DGateAce input screen 500 encountered by a user when generating the Transactional Gateway (TGATE) code. In this second screen 500, the user enters an OLTP service name 502, which is the name of the enterprise (Unisys 2200) service which will be involved in the transaction. The user also supplies the location of the view file 504, which will be a directory on the Microsoft Windows NT node, and further supplies the input buffer name 506, which will be a view from the view file. As discussed above, generally, an input view 503 is always required since the transactions will require input parameters. An output view 505 may or may not be supplied. If an output view 505 is supplied, the output view file location 508, and the output buffer name 510 are entered by the user.

The type of view buffer, X_Common and X_C_Type, which determine the type of parameters which will be included in the view buffer (e.g., long integer, integer, floating, etc.) is also supplied by the user. For the input buffer, the pushbutton is shown at 512, and for the output buffer, the pushbutton is shown at 514.

Once the parameters are supplied, the function name 516 is automatically generated by DGateAce from a concatenation of the information provided by the user. That is, an ASCII character string will appear in this field 516 after the user has entered the OLTP service 502 and view file names 504 and 508, respectively. This character string 516 is an arbitrarily-assigned name which will be used by the user when developing the client application. It will be used as the function call within the client when the client makes the request to the NT server. The code associated with this function is generated automatically by selecting the "Build" button 518.

More than one function may be added to a single interface. This is done by filling in the screen of FIG. 5 again with different service and view file names, then re-selecting the build button. If an entirely new interface is to be built, the user selects the "back" button 520, and then selects the "build next interface" button (FIG. 4, element 422) from screen one.

Attachment 1 is an example of the code automatically generated using the above-defined screens (shown in FIG. 4 and FIG. 5) for an Interface called "Test". This interface accesses an OLTP Service called TestSvc, which has input and output views which are the same, and which are called "EMP_BUF". This is illustrated in attachment 1 in the lines designated by bracket #601, on page A-1.

Since "transactional" was selected when this code was generated (see the lines marked by bracket #601), the code includes lines surrounded by comments "MTS Enable", and which are added to the code using a conditional compiler switch. It is this code which is of interest for this invention.

Bracket #602 on page A-2 shows a default message being set up which informs the user of a failure. For the two-phase commit protocol, default status is the transaction "failed". It is not necessary to perform this step if part of the transaction is not being performed within the MTS environment.

Bracket #603 on page A-3 is the definition for the buffer used to assemble the parameters which are passed by the client to the 2200 OLTP service. This definition is automatically generated by DGateAce when the user supplies the view name.

Bracket #604 on page A-3 designates the code which automatically sets up the object context. An object context is required by MTS for every COM transaction server that exists in the MTS environment. This object includes the data structures and methods which will ensure that a two-phase commit is performed. Initially, all parts of a transaction are registered as being "NULL", and later are registered with "Abort" or "Commit" status. This is discussed in more detail below. The Object Context is shown in FIG. 3 as a box behind the TGate_Server Dynamic Link Library (DLL).

Starting at arrow #605 on page A-3 and continuing through page A-5, the code performs packing of input parameters received from the client into the buffer defined in the foregoing code as specified by the view. This is done in both non-transactional and transactional modes.

Bracket #606 on page A-6 shows initialization of the Object Context with Failure status, and to a default action of "SetAbort". As stated above, this is the default status generally selected for XATMI- compliant transactions performing two-phase commits. As a result of this initialization to abort, if an error is generated anywhere in the middle of the program, all parts of the transaction will abort instead of commit.

At Bracket #607 on page A-6, the transaction is initiated with a function call of "Process Transaction". The code for "Process Transaction" is located in the TGate_Server.dll. This process translates the input buffer into a format that the resource dispenser (HTP/ic) will understand, and makes a call to HTP/ic using "tpcall()" (an XATMI compliant function call). This call passes all information needed, including the view names, the OLTP transaction service name, and the 2200 IP address. The status returned by this call will indicate whether the transaction completed successfully on the Unisys 2200 enterprise server.

At #608 on page A-6, the Object Context on the MTS system is informed of the status of the transaction success. When success occurs, the Object Context interfaces with the HTP/ic resource dispenser to ensure that all portions of the transaction on both the MTS and 2200 systems occurs.

At #609 on pages A-6 and A-7, the returned parameters are unpacked. At #610, the Object Context is set to failure. The Object Context must abort all parts of the transaction.

The code shown in attachment 1, which is generated by the DGateAce program (FIG. 3, element 248), takes care of calling the Unisys 2200 Enterprise OLTP service, and further takes care of setting up of the context object, and of informing the context object of status returned from the 2200, and status associated with the other tasks like packing and unpacking the input/output parameters. This may be only part of the code which is included as part of the COM Server Application. Other code may be added by the user. However, it is possible to run with the generated code without any changes.

As discussed above, the overall transaction includes calls to MTS services which access MTS resources. If this were not the case, there would be no reason to use transaction mode since the enterprise server takes care of the two-phase commit for those portions of the transaction on the Unisys enterprise server. These services are either developed by one of the users themselves, or are provided by a third-party vendor. The calls to the MTS services must be added by editing the code included in attachment 1. The "Process Transaction" function will only call enterprise OLTP (Unisys 2200) services. The MTS calls to service components on the Windows NT platform are separate.

If a user wants to update a database on the Windows NT platform, the user can either update the server component that performs the "ProcessTransaction()" to include code that updates a local NT database, such as SQL, or the user can create a new component that updates a database on the Windows NT platform. This new MTS component that updates a database on the Windows NT platform can call the DGateAce server component, the DGateAce server component can call the new MTS NT database update component, or a separate, newly created module can call both the new MTS NT database update component and the DGateAce server component. If the MTS service returns an error, the object context must be set to rollback (set Abort).

Following each of the service calls to an MTS service, the status returned by the service call must be registered with the Object Context. This is done by adding a call which is similar to that shown by bracket #608 or #610. If the Object Context receives any failure status, the Object Context rolls back all portions of the transaction on the MTS system, and also communicates with the HTP/ic resource dispenser so that the resource dispenser can cause the 2200 portions of the transaction to also be rolled back. Otherwise, if a successful status is received on all portions of the transaction, the Object Context and the HTP/ic resource dispenser operate in conjunction to cause all portions of the transaction to be committed to the database.

Page A-8 of attachment 1 provides an automatically generated buffer definition which is generated by DGateAce from the view file definition and data type specified by the user in the DGateAce user input screens two and one, respectively. This buffer definition is provided to that the user can insert this information into the Client Application using "cut" and "paste" operations. This saves the user from having to derive the information from the view file, then re-type it into the client application, which is error-prone and time-consuming.

Having thus described the preferred embodiments of the present invention, those of skill in the art will readily appreciate that the teachings found herein may be applied to yet other embodiments within the scope of the claims hereto attached.

What is claimed is:

1. In a data processing system having a plurality of interconnected hardware platforms and a user developed client application coupled to the platforms, wherein said client application is capable of requesting execution of a transaction across the plurality of hardware platforms, the improvement comprising:

means for automatically generating interface source code which enables the client application to initiate and participate in said transaction.

2. In a data processing system having a user developed client application coupled to a Microsoft Transaction Server (MTS) environment and an enterprise On-Line Transaction Processing (OLTP) environment, wherein said client application is capable of requesting execution of a transaction across said MTS environment and said OLTP environment, the improvement comprising:

means for automatically generating interface source code application which enables the client application to initiate and participate in said transaction.

3. A data processing system according to claim 2, wherein a resource dispenser coordinates the enterprise OLTP environment and the MTS environment portions of the transaction so that a two-phase commit protocol is achieved.

4. A data processing system according to claim 3, wherein said generated interface source code includes a routine for calling an OLTP service located within the enterprise OLTP environment.

5. A data processing system according to claim 3, wherein said generated interface source code includes a routine which sets up a context object.

6. A data processing system according to claim 3, wherein said generated interface source code includes a routine which informs a context object of status returned from an OLTP service located within the enterprise OLTP environment.

7. A data processing system according to claim 3, wherein said generated interface source code includes a buffer definition file.

8. A data processing system according to claim 2, wherein said enterprise OLTP environment resides on a Unisys 2200 series mainframe computer.

9. Apparatus for the automated generation of a set of computer routines which enables a user-developed client application to initiate and participate in a transaction which is performed across several interconnected hardware platforms.

10. An apparatus according to claim 9, wherein at least one of said hardware platforms is an enterprise On-Line Transaction Processing (OLTP) System.

11. An apparatus according to claim 9, wherein at least one of said hardware platforms executes within the Microsoft Transaction Server (MTS).

12. Apparatus for the automated generation of a set of computer routines which enables a user-developed client application to initiate and participate in a transaction which is performed across several hardware platforms wherein one of the platforms is an enterprise OLTP system, and another one of the platforms executes within the Microsoft Transaction Server (MTS).

13. An apparatus according to claim 12, wherein said set of generated routines includes a routine for calling an OLTP service located within the enterprise OLTP environment.

14. An apparatus according to claim 12, wherein said of generated routines includes a routine which sets up a context object.

15. An apparatus according to claim 12, wherein said set of generated routines includes a routine which informs a context object of status returned from an OLTP service located within the enterprise OLTP environment.

16. In a data processing system having a user developed client application coupled to a plurality of hardware platforms, wherein at least one of the hardware platforms is an enterprise OLTP system, and another one of the hardware platforms executes within the Microsoft Transaction Server (MTS), a method for automatically generating code used which enables the client application to initiate and participate in the transaction, comprising the steps of:

creating a service on said OLTP system, including the creation of service input and output view files;

transferring said view files from said OLTP system to a workstation environment such that said view files can be accessed by a function builder utility;

executing said function builder utility to automatically generate a set of routines which enable the client application to initiate and participate in the transaction; and integrating said set of generated routines into the user developed client application.

17. A method according to claim 16, wherein said set of generated routines includes a routine for calling an OLTP service located within the enterprise OLTP system.

18. A method according to claim 16, wherein said set of generated routines includes a routine which sets up a context object.

19. A method according to claim 16, wherein said set of generated routines includes a routine which informs a context object of status returned from an OLTP service located within the enterprise OLTP system.

* * * * *